United States Patent
Stuible et al.

(10) Patent No.: US 11,209,621 B2
(45) Date of Patent: Dec. 28, 2021

(54) LENS HAVING A FIXED FOCAL LENGTH AND CONSTANT OVERALL LENGTH FOR AUTO FOCUS APPLICATIONS

(71) Applicant: Leica Camera AG, Wetzlar (DE)

(72) Inventors: Dietmar Stuible, Wetzlar (DE); Sigrun Kammans, Herborn (DE); Stefan Roth, Lahnau (DE)

(73) Assignee: Leica Camera AG, Wetzlar (DE)

(*) Notice: Subject to any disclaimer, the term of this patent is extended or adjusted under 35 U.S.C. 154(b) by 252 days.

(21) Appl. No.: 16/333,938

(22) PCT Filed: Sep. 18, 2017

(86) PCT No.: PCT/DE2017/100798
§ 371 (c)(1),
(2) Date: Mar. 15, 2019

(87) PCT Pub. No.: WO2018/050176
PCT Pub. Date: Mar. 22, 2018

(65) Prior Publication Data
US 2019/0204567 A1    Jul. 4, 2019

(30) Foreign Application Priority Data
Sep. 18, 2016 (DE) .................... 10 2016 117 547.1

(51) Int. Cl.
*G02B 13/00* (2006.01)
*G02B 9/64* (2006.01)
(Continued)

(52) U.S. Cl.
CPC .......... *G02B 13/0045* (2013.01); *G02B 9/60* (2013.01); *G02B 9/64* (2013.01); *G02B 13/04* (2013.01);
(Continued)

(58) Field of Classification Search
CPC ... G02B 9/60; G02B 9/62; G02B 9/64; G02B 13/0045; G02B 13/005; G02B 13/006;
(Continued)

(56) References Cited

U.S. PATENT DOCUMENTS

| 4,726,669 A | 2/1988 | Angenieux |
| 7,477,459 B2 | 1/2009 | Liao |

(Continued)

FOREIGN PATENT DOCUMENTS

| CN | 102053348 A | 5/2011 |
| JP | 2000-214380 A | 8/2000 |

(Continued)

OTHER PUBLICATIONS

International Search Report (PCT/ISA/210) issued in PCT Application No. PCT/DE2017/100797 dated Jan. 4, 2018 with English translation (five (5) pages).

(Continued)

*Primary Examiner* — Jordan M Schwartz
(74) *Attorney, Agent, or Firm* — Crowell & Moring LLP

(57) ABSTRACT

A lens with a fixed focal length includes five lens-element groups, a first front lens-element group, a second lens-element group, a third lens-element group, a fourth lens-element group, and a fifth back lens-element group is arranged in a stationary manner. Relative to an imaging plane in a lens barrel and both the focusing front group and the focusing back group are movable jointly relative to one another and to the lens-element groups arranged in a stationary manner in order to focus the lens on objects at different object distances.

11 Claims, 10 Drawing Sheets

(51) Int. Cl.
  *G02B 27/00* (2006.01)
  *G02B 13/04* (2006.01)
  *G02B 9/60* (2006.01)
  *G02B 13/18* (2006.01)
(52) U.S. Cl.
  CPC ......... *G02B 13/18* (2013.01); *G02B 27/0075* (2013.01)
(58) Field of Classification Search
  CPC ........ G02B 13/02; G02B 13/04; G02B 13/18; G02B 27/0025
  USPC ................. 359/754–757, 759, 763–764, 767
  See application file for complete search history.

(56) References Cited

U.S. PATENT DOCUMENTS

| | | | |
|---|---|---|---|
| 8,619,374 B2 | 12/2013 | Abe et al. | |
| 2002/0060855 A1 | 5/2002 | Ohashi | |
| 2004/0017605 A1 | 1/2004 | Kasahara et al. | |
| 2008/0144186 A1 | 6/2008 | Feng et al. | |
| 2009/0015935 A1 | 1/2009 | Szapiel et al. | |
| 2010/0157445 A1 | 6/2010 | Taki | |
| 2011/0096410 A1 | 4/2011 | Ryu | |
| 2011/0199689 A1 | 8/2011 | Ishibashi | |
| 2012/0081798 A1 | 4/2012 | Ryu | |
| 2013/0070124 A1 | 3/2013 | Katsuyama et al. | |
| 2014/0016025 A1 | 1/2014 | Kosaka | |
| 2014/0146405 A1 | 5/2014 | Tsutsumi et al. | |
| 2014/0184887 A1 | 7/2014 | Yonetani et al. | |
| 2014/0212123 A1 | 7/2014 | Sato | |
| 2015/0247994 A1* | 9/2015 | Tomioka | G02B 13/0045 348/340 |
| 2015/0323764 A1* | 11/2015 | Mori | G02B 13/26 348/360 |
| 2016/0178875 A1 | 6/2016 | Matsumura et al. | |
| 2016/0299415 A1 | 10/2016 | Minefuji | |
| 2017/0192207 A1 | 7/2017 | Chen et al. | |
| 2017/0374271 A1 | 12/2017 | Takao | |
| 2018/0059382 A1* | 3/2018 | Noda | G02B 15/173 |
| 2018/0164540 A1* | 6/2018 | Kawamura | G02B 7/10 |
| 2019/0369371 A1 | 12/2019 | Katou et al. | |
| 2020/0192060 A1* | 6/2020 | Sawamoto | G02B 9/12 |

FOREIGN PATENT DOCUMENTS

| | | |
|---|---|---|
| JP | 2007-298832 A | 11/2007 |
| JP | 2011-48232 A | 3/2011 |
| JP | 2011-191743 A | 9/2011 |
| JP | 2012-58682 A | 3/2012 |
| JP | 2012-242742 A | 12/2012 |
| JP | 2015-34899 A | 2/2015 |
| JP | 2016-109810 A | 6/2016 |
| JP | 2016-118770 A | 6/2016 |
| WO | WO 2018/139160 A1 | 8/2018 |

OTHER PUBLICATIONS

German-language Written Opinion (PCT/ISA/237) issued in PCT Application No. PCT/DE2017/100797 dated Jan. 4, 2018 (six (6) pages).
International Search Report (PCT/ISA/210) issued in PCT Application No. PCT/DE2017/100796 dated Jan. 5, 2018 with English translation (five (5) pages).
German-language Written Opinion (PCT/ISA/237) issued in PCT Application No. PCT/DE2017/100796 dated Jan. 5, 2018 (six (6) pages).
International Search Report (PCT/ISA/210) issued in PCT Application No. PCT/DE2017/100798 dated Mar. 7, 2018 with English translation (10 pages).
German-language Written Opinion (PCT/ISA/237) issued in PCT Application No. PCT/DE2017/100798 dated Mar. 7, 2018 (eight (8) pages).
English translation of International Preliminary Report on Patentability (PCT/IB/338 & PCT/IB/373) issued in PCT Application No. PCT/DE2017/100798 dated Mar. 28, 2019, including English translation of document C2 (Japanese-language Written Opinion (PCT/ISA/237) previously filed on Mar. 15, 2019) (nine (9) pages).
U.S. Office Action issued in U.S. Appl. No. 16/333,922 dated Jan. 6, 2021 (21 pages).
U.S. Office Action issued in U.S. Appl. No. 16/333,932 dated Feb. 4, 2021 (21 pages).
U.S. Office Action issued in U.S. Appl. No. 16/333,932 dated Jun. 11, 2021 (12 pages).
U.S. Office Action issued in U.S. Appl. No. 16/333,922 dated Apr. 19, 2021 (24 pages).

* cited by examiner

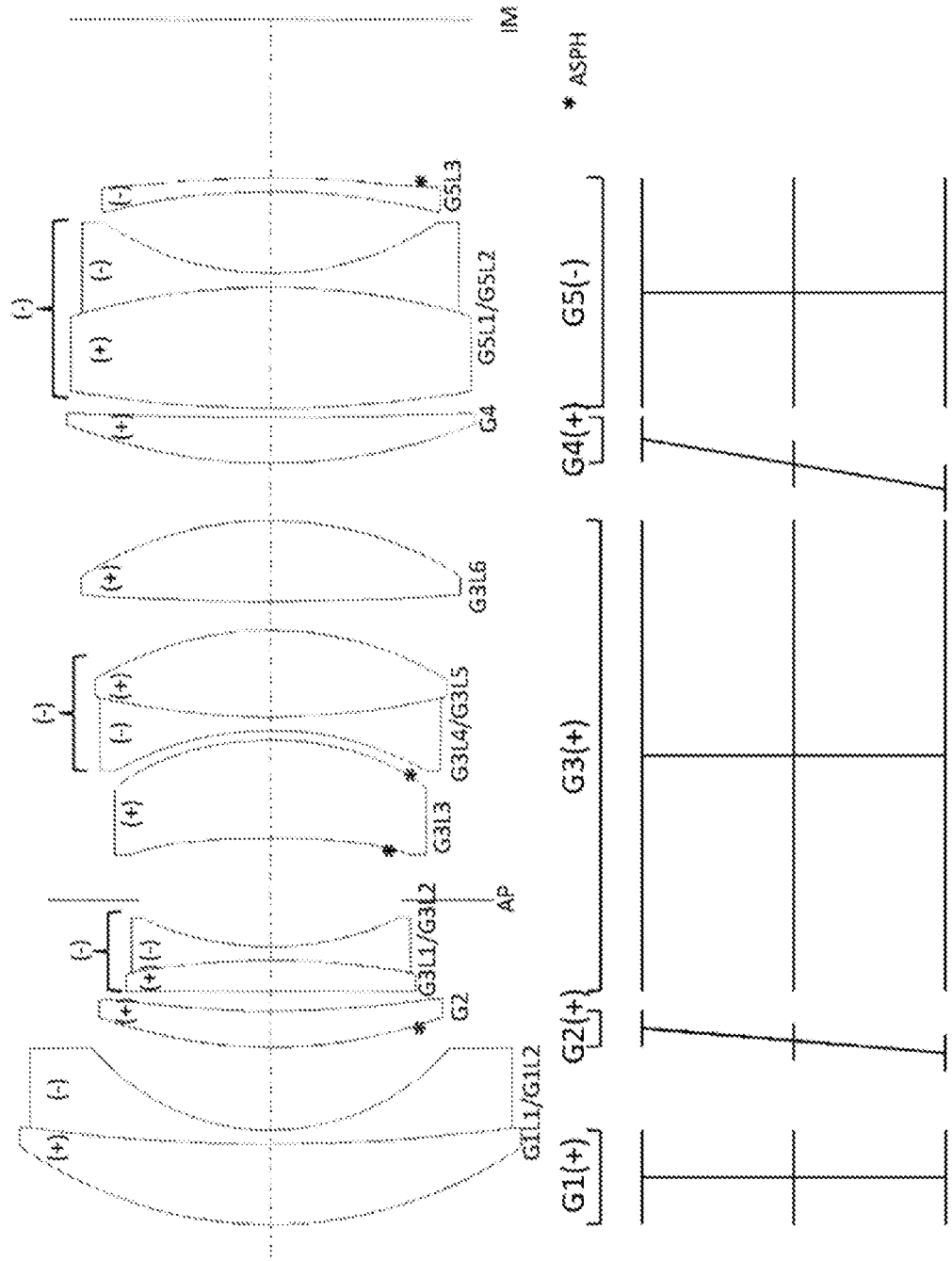

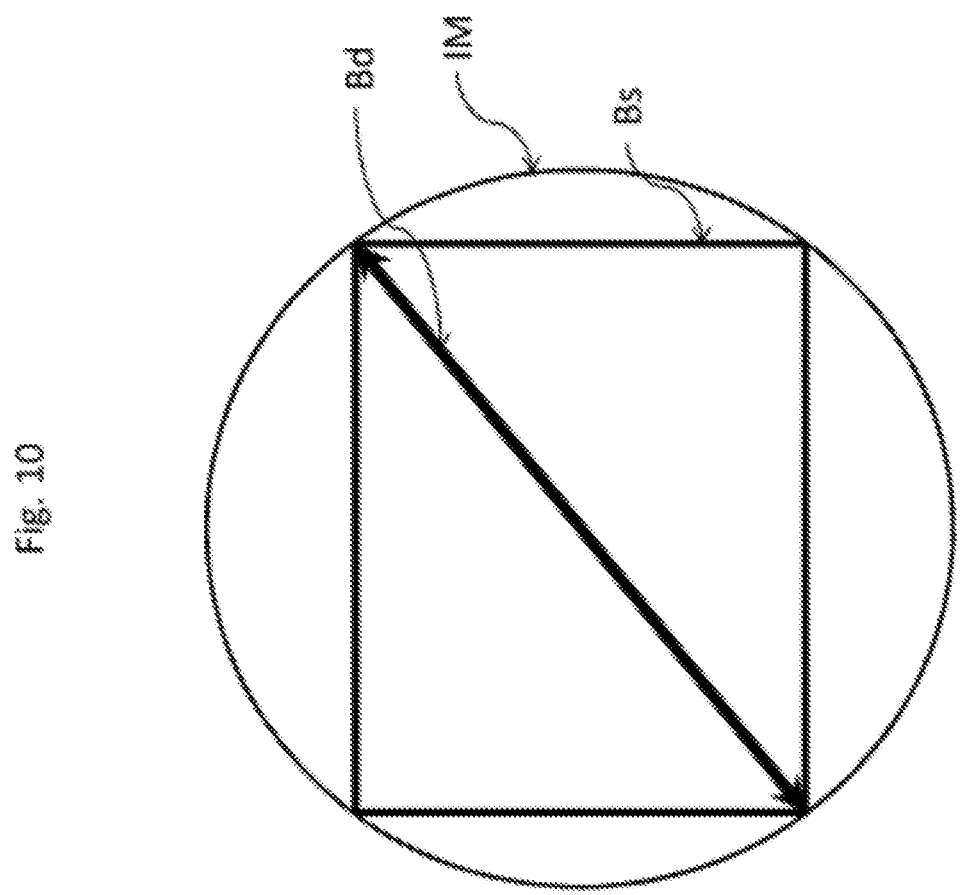

LENS HAVING A FIXED FOCAL LENGTH AND CONSTANT OVERALL LENGTH FOR AUTO FOCUS APPLICATIONS

BACKGROUND

The embodiments of the invention relate to an interchangeable lens with a fixed focal length. Such lenses are used for photographic image recording purposes from analog photography and are likewise used for digital image recording. To an increasing extent digital cameras no longer have a mirror which is pivotable into and out of the image recording beam path and which deflects the object field to be photographed into a viewfinder via a prism for focusing purposes and in order to select the image detail, rather the image selection is carried out by permanent image recording by means of the image recording sensor and on the basis of an object detail obtained therefrom, which is represented on a display on the rear side of the camera, or with the aid of an electronic viewfinder. The focusing of these lenses is carried out automatically with the aid of electronic autofocus signals and corresponding driving of the focusing element in the lens. Photographic lenses for producing a good imaging performance usually consist of two or more lens-element groups, which in turn have individual lens elements mounted in a stationary manner or in a displaceable manner along the optical axis. A lens-element group may be displaceable along the optical axis for the purpose of focusing the lens at different object distances. This can be for example the lens head, that is to say the front lens-element group facing the object plane, or the complete lens. Such an arrangement is also called total focusing. With this type of focusing, however, the structural length of the lens changes during focusing, which contains disadvantages with regard to tightness. Therefore, lenses in which a lens element mounted in a displaceable manner in the lens, the so-called focusing element, may be displaced along the optical axis. Such an arrangement is also called internal focusing. It is true that lenses of this design can be focused in wide ranges from an infinite object distance through to close range of a few meters or even centimeters, that is to say that the object is imaged sharply onto the image recording plane; however, the optical imaging performance decreases precisely at close range. Optical image aberrations such as distortion, image field curvature, aperture aberrations, chromatic aberrations and coma increase. Despite focusing at the desired object distance, the image results then often no longer satisfy the requirements in respect of the imaging performance of modern image recording systems. If a high imaging performance is nevertheless intended to be achieved, complicated and expensive lens designs having a high number of different lens elements are required. Alternatively, in order to increase the imaging performance in the case of lenses with total focusing, principally for close range, a second movable lens element may be provided, a so-called float element, which counteracts the imaging aberrations, but for the rest has no influence on the focus position.

In order to realize lenses with variable focal lengths (zoom lenses), at least two lens elements or lens-element groups which are adjustable relative to one another on curves are normally provided. The focusing is still carried out by means of a focus element that is adjustable for focusing. In the case of such lenses, accordingly, one group from two lens-element groups performs the focal length variation and, independently thereof, a further lens-element group is used for focusing.

One such lens with a variable focal length is disclosed in US 2013/0070124 A1, for example. This lens comprises three movable lens-element groups for focal length and focus variation.

U.S. Pat. No. 8,619,374 B2 discloses an interchangeable lens with a variable focal length. A stationary front lens-element group is followed by an axially adjustable lens-element group for changing the focal length. Two mutually independently adjustable focusing lens-element groups are inserted between two further stationary lens-element groups. Imaging aberrations that arise depending on the change in focal length are intended to be compensated for with the aid of the two focusing lens-element groups.

SUMMARY

The problem addressed by the embodiments of the invention was that of making possible, in the case of interchangeable lenses with a fixed focal length, a very high constant image quality during focusing at different object distances from infinity to extremely close range at less than 30 cm or with an imaging scale of up to 1:3, wherein the lens elements required for focusing should have a simple construction with low weight in order to be able to achieve a fast and quiet autofocus drive having high accelerations. Furthermore, the lenses should be suitable for use on mirrorless recording systems with a short flange focal distance, have a short back focal distance and at the same time have a sufficiently large distance between the exit pupil of the lens and the imaging plane. For suitability for modern image sensors, the angle of incidence of light in the imaging plane, as viewed from the perpendicular, should not become too large.

This problem is solved according to the invention by means of the inventive lens. With regard to the solution features specified in the claims it should be noted that in modern optical design use is usually made of automatic correction programs, such as e.g. "Code V" from Optical Research Associates, which are able to calculate, from predefined lens-element sequences and refractive power distributions, proposals for functional lens systems having a correction state optimized for a specific task. On the basis of targeted alterations of the specified parameters by the optical designer, the correction state automatically achieved is improved further in each case.

With the features of claim 1, it is possible in this way already to obtain the design data for radii, lens-element thicknesses, distances between lens elements, refractive indices and Abbe numbers of the optical glasses to be used. When the features specified in the dependent claims are taken into account, the design parameters can be progressively improved in a targeted manner.

Exemplary embodiments of the lens according to the invention are illustrated to scale in the drawing; design data can be gathered from the tables assigned to respective figures. It is evident to the person skilled in the art, an optical designer, that the design complexity for lenses according to the embodiments of the invention decreases if a lower optical imaging performance is accepted in return.

The solution feature of lenses according to the embodiments of the invention consists in providing in a lens barrel two focusing lens-element groups mounted in a displaceable manner along an optical axis with respect to an imaging plane, wherein a focusing front group as viewed from the object side is arranged upstream, and a focusing back group as viewed from the object side is arranged downstream, of a stationary central group having lens elements and an aperture stop (iris diaphragm). As a result of the control of the two focusing lens-element groups jointly relative to one another and to the other lens-element groups arranged in a stationary manner in the lens barrel, the course of the image aberrations that is introduced during focusing at different object distances is advantageously mutually compensated for. In addition, a lens according to the embodiments of the invention comprises a front lens-element group, which is stationary as viewed from the object side, and a stationary back lens-element group facing the imaging plane. In this way, a lens with a fixed focal length is realized which consists of five lens-element groups, of which three are mounted in a stationary manner and two are mounted in a displaceable manner along the optical axis for focusing purposes.

In contrast to lenses having total focusing with a floating element, in the case of the focusing according to the embodiments of the invention (also called double focusing hereinafter) the two focusing lens-element groups jointly perform the displacement of the focus position for focusing the object plane onto the imaging plane. The travel of the focusing groups for focusing from infinity to the near setting (maximum movement distance corresponds to the total travel) is limited by the mechanical structural length of the lens and the motor/drive concept of the autofocus. In this case, the ratio of the two respective total travels to one another can be one or else not equal to one. It results from design-dictated spatial limitations and can be varied in order to optimize the aberrations. According to the embodiments of the invention, in this case the front lens-element group and the back lens-element group have a negative refractive power, or the front lens-element group and the back lens-element group have a positive refractive power. In an alternative embodiment, the front lens-element group has a positive refractive power and the back lens-element group has a negative refractive power or the front lens-element group has a negative refractive power and the back lens-element group has a positive refractive power.

In one particular embodiment of the lenses, both the focusing front group G2 and the focusing back group G4 have a positive refractive power and move away from the imaging plane IM during focusing from infinity to the near setting.

In an alternative embodiment of the lenses, the focusing front group G2 has a positive refractive power and the focusing back group G4 has a negative refractive power, wherein the focusing front group moves away from the imaging plane IM during focusing from infinity to the near setting and the focusing back group moves toward the imaging plane during focusing from infinity to the near setting.

In a further embodiment of the lenses, both the focusing front group G2 and the focusing back group G4 move toward the imaging plane IM during focusing from infinity to the near setting, wherein both focusing groups have a negative refractive power.

In a further embodiment of the lenses according to the embodiments of the invention, the focusing front group G2 has a negative refractive power and the focusing back group G4 has a positive refractive power, wherein the focusing front group moves toward the imaging plane IM during focusing from infinity to the near setting and the focusing back group moves away from the imaging plane during focusing from infinity to the near setting.

In the case of lenses for the full-frame format (image circle diameter 43.3 mm) with focal lengths e.g. between 13 mm and 65 mm, it has been found to be advantageous to use more lens elements having a negative refractive power than having a positive refractive power in the front lens-element group or to embody said lens elements as having overall negative refractive power. In the case of full-frame format lenses with focal lengths, e.g. between 55 mm and 185 mm, advantageously more lens elements having a positive refractive power than having a negative refractive power are used in the front lens-element group, wherein the front lens-element group has a positive total refractive power.

In the case of lenses according to the embodiments of the invention having central groups with a positive total refractive power, a favorable distribution of the refractive powers in the back assembly and compliance with design stipulations arising for example from the predefined maximum external dimensions of the lens, the predefined maximum aperture and lens-element diameters and from the limiting dimensions of a camera bayonet, in particular the free internal diameter thereof are ensured.

Exemplary embodiments of such lenses are illustrated in FIGS. 3 to 9 of the drawing and are described in even greater detail with reference to tables with focal length indications [f'] for the five lens-element groups and refractive power values [Dpt.].

In this way, it is possible preferably to realize, e.g. a 24 mm, 50 mm or 90 mm lens having a maximum aperture number of 2.0, or else a 50 mm lens having a maximum aperture number of 1.4, wherein the focal length indications in this case relate to the full-frame format (image circle diameter 43.3 mm). For the person skilled in the art it is possible, whilst complying with the parameters specified in the patent claims, to realize lenses having a smaller (down to e.g. 0.9) or larger (e.g. 4.0) maximum aperture number. With a smaller maximum aperture number the design complexity increases, which has disadvantageous effects on the lens volume, the number of lens elements required and the lens-element diameters if the optical imaging performance (aberrations) is intended not to deteriorate to an excessively great extent. With a larger maximum aperture number, by contrast, the design complexity usually decreases with the imaging performance remaining the same or being poorer.

A scaling of the geometric data of the lens to other image formats is possible with the respective maximum aperture number being maintained and brings about a corresponding scaling of the focal length. Lenses realized in this way, with design features otherwise corresponding with respect to the embodiments of the invention, are likewise the subject matter of the invention.

In one particular embodiment of the lens according to the invention, the ratio f1/f of the focal lengths f1 of the front lens-element group and f of the entire lens lies between −40 and 30, the ratio f2/f of the focal lengths f2 of the focusing front group and f of the entire lens lies between −10 and 20, the ratio f3/f of the focal lengths f3 of the central group and f of the entire lens lies between −30 and 40, the ratio f4/f of the focal lengths f4 of the focusing back group and f of the entire lens lies between −10 and 20, and the ratio f5/f of the focal lengths f5 of the back lens-element group and f of the entire lens lies between −40 and 30.

In a first step of optimizing the ratio f1/f, limitation to a range of between −2.0 and −0.8 or between 0.4 and 5.0 has proved to be expedient. In order to avoid an excessive sensitivity with regard to mounting tolerances to be complied with, it is particularly advantageous to limit the ratio downwardly in terms of value (small absolute values), and in order to achieve a structural size that is as compact as possible, the ratio f1/f should be limited upwardly in terms of value (large absolute values). An embodiment of the invention that is optimized with regard to mounting tolerances and structural size therefore has a ratio f1/f of −1.7 and −1.0, or values therebetween, or of 0.5 and 2.1, or values therebetween.

In one particular embodiment of the lens according to the invention, a reduction of the focusing travel of the focusing front group and of the structural length of the lens can be achieved by means of a limitation of the ratio f2/f to a range of between −1.0 and −0.3 or between 1.0 and 10.0. In general, small focusing travels are advantageous for fast focusing, but they also increase the tolerance sensitivity. On the other hand, an excessively large focusing travel firstly increases the structural length and secondly requires powerful and fast motorized drives having a high energy consumption for focusing. The limitation of the ratio f2/f to −0.7 and −0.4 or 1.3 and 5.6, or a range of between one of the two abovementioned ranges, is therefore particularly advantageous for a double focusing according to the embodiments of the invention.

An advantageous optimization carried out in the same way for the focusing back group is manifested in the case of a limitation of the ratio f4/f to a range of between −5.0 and 5.0, wherein a further optimization can be achieved by a limitation −1.9 and −0.8 or to 0.6 and 0.9, or a range between −1.9 and −0.8 or between 0.6 and 0.9.

An advantageous configuration of the lens elements of the central group with regard to manufacturing tolerances and structural size is achieved by means of a limitation of the ratio f3/f to a range of between −2.0 and −0.5 or 0.2 and 5.0, wherein an optimization according to the embodiments of the invention resides in a ratio f3/f in a range of between of −1.2 and −1.0 or 0.4 and 3.4, or in a range of between −1.2 and −1.0 or between 0.4 and 3.4.

Large absolute values of the ratio f5/f of the back lens element group result in a disadvantageously long structural length; with small absolute values, the lens-element group becomes sensitive with regard to mounting tolerances. An advantageous optimization therefore consists in a limitation of the ratio f5/f in a range of between −28.0 and −0.6 or between 0.5 and 10.0. Particularly in the case of lenses for mirrorless photographic cameras, in which experience shows that there are very short distances between the last lens element (located near the imaging plane) in the light direction and the imaging plane, it is advantageous to embody the angle of incidence of the light, as viewed from the perpendicular to the imaging plane, such that it is not too large. An angle of incidence of the light of less than 35° has proved to be advantageous. The lenses are thus particularly suitable for camera systems having a short flange focal distance and a short back focal distance, e.g. less than 25 mm in each case, relative to the full-frame format described above. Excessively small absolute values of the ratio f5/f therefore have a disadvantageous effect since they increase the angle of incidence of the light and vignetting thus increases. An embodiment of the lens that is optimized with regard to this problem area therefore has values of −21.0 and −0.8 or 0.8 and 5.2, or in each case a value in the range therebetween, for the ratio f5/f.

In one development according to the embodiments of the invention, the lens has a ratio of the total focal length f to the image circle diameter in the imaging plane (IM) of between 0.3 and 5. In this way, it is possible to realize lenses with a sufficiently large distance between the exit pupil and the imaging plane, e.g. greater than 40 mm, and with a focal length of between 13 mm and 216.5 mm, relative to the full-frame format described above.

Lightweight focusing groups are advantageous for a high focusing speed. A ratio of the volume V of respectively the focusing front group and focusing back group to the image circle diameter in the imaging plane raised to the third power is less than 0.1 (V/Bd$^3$<0.1) and in particular lies below 0.08 (V/Bd$^3$<0.08). Particularly advantageously the respective focusing group has a weight of less than 10 g (grams).

The value for the relative volume of 0.08, relative to the full-frame format, then corresponds to a weight of 23.2 g in the case of a lightweight glass, such as, for example, N-PSK53A from Schott, and to a weight of 35.8 g in the case of a heavy glass, such as, for example, N-LASF31A from Schott. In the case of medium-format systems having an image circle diameter 1.5 times larger, lens-element weights of 78.3 g in the case of a lightweight glass and 120.8 g in the case of a heavy glass thus result. In the case of APS systems having an image circle diameter 1.5 times smaller, lens-element weights of 6.9 g in the case of a lightweight glass and 10.6 g in the case of a heavy glass thus result.

A low weight is advantageous for the focusing speed and has an advantageous effect on motor and noise concepts.

In one particular embodiment of the lens according to the invention, the front lens-element group consists of four lens elements, wherein the first lens element, the second lens element and the third lens element have a positive refractive power and the fourth lens element has a negative refractive power wherein the third lens element and the fourth lens element are combined to form a lens-element doublet having a negative total refractive power. One exemplary embodiment comprising a front lens-element group according to the invention is illustrated as lens 1:2 90 mm and 1:2 75 in FIGS. 1 and 2 of the drawing and is described in even greater detail with reference to the associated tables with focal length indications [f'] and refractive power values [Dpt.].

In an alternative lens, the front lens-element group consists of four lens elements, wherein the first lens element and the second lens element have a positive refractive power, the third lens element has a negative refractive power and the fourth lens element has a positive refractive power, wherein either the third lens element and the fourth lens element are combined to form a lens-element doublet having a negative total refractive power, or the second lens element, the third lens element and the fourth lens element are combined to form a cemented element having a positive total refractive power. The drawing contains in this respect exemplary embodiments which are elucidated in more specific detail in FIG. 6 and FIG. 7 and which are described in even more specific detail as 1:2 90 mm lenses with reference to the associated tables with focal length indications [f'] and refractive power values [Dpt.].

In another exemplary embodiment, the front lens-element group also consists of four lens elements, wherein the first lens element and the second lens element have a negative refractive power, the third lens element has a positive refractive power and the fourth lens element has a negative refractive power. In this example, the third and fourth lens elements are combined to form a lens-element doublet having a negative total refractive power. The drawing in this respect in FIG. 5 together with the associated table indicates a 1:2.0 24 mm lens with exact group focal lengths and refractive power values.

In a further lens, the front lens-element group consists of only one lens element having a negative or positive refractive power. With respect to this example, a 1:2.0 50 mm lens is indicated in FIG. 4 and a 1:1.4 50 mm lens is indicated in FIG. 8 and more precise values are indicated by the respective tables.

In a further embodiment of the lens according to the invention, the front lens-element group consists of two lens elements, wherein the first lens element has a positive refractive power and the second lens element has a negative refractive power and both lens elements are combined to form a lens-element doublet having a negative total refractive power. FIG. 9 of the drawing shows a corresponding exemplary embodiment that is described in even more specific detail as a 1:1.4 50 mm lens on the basis of the associated table.

In a further embodiment of the lens according to the invention, the front lens-element group consists of three lens elements, wherein the first lens element and the second lens element have a negative refractive power and the third lens element has a positive refractive power. In this case, the second and third lens elements are combined to form a lens-element doublet having a negative total refractive power. An exemplary embodiment of a 1:2.0 50 mm is described in greater detail in the drawing with FIG. 3 together with the associated table.

In one advantageous configuration of a lens according to the embodiments of the invention, the central group consists of one lens element having a positive refractive power, wherein the iris diaphragm AP is arranged in a stationary fashion upstream thereof. An exemplary embodiment of 1:2.0 50 mm is described in greater detail in the drawing with FIG. 7 together with the associated table.

In one development of the central group, the latter consists of two lens elements, wherein the first lens element has a negative refractive power and the second lens element has a positive refractive power and the iris diaphragm AP is arranged in a stationary fashion between the first and the second lens elements. FIGS. 1 and 2 show such a central group.

In an alternatively optimized embodiment of the central group, the latter consists of three lens elements, wherein the first lens element has a negative refractive power, the second lens element has a positive refractive power and the third lens element has a positive refractive power. In this case, the first and second lens elements are combined to form a lens-element doublet having a positive total refractive power, and, in an example illustrated in FIG. 5, the iris diaphragm AP is arranged in a stationary fashion between the lens-element doublet and the third lens element.

In a further central group consisting of three lens elements, the first lens element has a negative refractive power, the second lens element has a positive refractive power and the third lens element has a negative refractive power. The second and third lens elements are combined to form a lens-element doublet having a positive total refractive power. In the example shown in FIG. 6, the iris diaphragm AP is arranged in a stationary fashion upstream of the first lens element.

In an alternative embodiment, the central group consists of four lens elements, wherein the first lens element has a positive refractive power, the second lens element has a negative refractive power and the third and fourth lens elements have a positive refractive power. In this case, the second and third lens elements are combined to form a lens-element doublet having a positive total refractive power, wherein iris diaphragm AP is arranged in a stationary fashion upstream of the first lens element. FIG. 3 shows such an exemplary embodiment.

FIG. 4 illustrates an exemplary embodiment comprising a central group consisting of five lens elements. The first lens element has a positive refractive power and the second lens element has a negative refractive power, and both lens elements are combined to form a lens-element doublet having a negative total refractive power. In this embodiment, the third lens element has a negative refractive power and the fourth lens element has a positive refractive power, wherein both lens elements are combined to form a lens-element doublet having a positive total refractive power. The fifth lens element has a positive refractive power and the iris diaphragm AP is arranged in a stationary fashion between the two lens-element doublets.

In an alternative embodiment, the central group consists of six lens elements, wherein the first lens element has a positive refractive power and the second lens element has a negative refractive power and both lens elements are combined to form a first lens-element doublet having a negative total refractive power. The third lens element has a positive refractive power, the fourth lens element has a negative refractive power and the fifth lens element has a positive refractive power, wherein the fourth and fifth lens elements are combined to form a second lens-element doublet having a negative total refractive power. The sixth lens element has a positive refractive power. In the example illustrated in FIGS. 8 and 9, the iris diaphragm AP is arranged in a stationary fashion between the first lens-element doublet and the third lens element.

In one particular embodiment of the lens according to the invention, the back lens-element group consists of three lens elements, wherein the first lens element has a positive refractive power and the second lens element has a negative refractive power and both lens elements are combined to form a lens-element doublet having a negative total refractive power. In an exemplary embodiment illustrated in FIGS. 8 and 9, the third lens element has a negative refractive power.

In a further embodiment of the lens, the back lens-element group likewise consists of three lens elements, wherein the first lens element has a positive refractive power and the second lens element has a negative refractive power, and both lens elements are combined to form a lens-element doublet having a positive total refractive power. In an exemplary embodiment shown in FIG. 3, the third lens element has a positive refractive power.

An alternative embodiment comprises a back lens-element group having two lens elements. The exemplary embodiments shown in FIGS. 1, 2 and 7 have in each case a positive refractive power in the first lens element and a negative refractive power in the second lens element.

A back lens-element group constructed from only one lens element having a negative refractive power is illustrated by way of example in each case in FIGS. 4, 5 and 6.

Particularly advantageously, for the correction of monochromatic imaging aberrations, such as aperture aberrations, coma, astigmatism, curvature and distortion, one or more lens elements having one or two aspherical surfaces can be provided.

In the case of the exemplary embodiments specified in the drawing, said aspherical surfaces are identified by an * in FIGS. 3, 4, 5, 6, 7, 8 and 9.

In order to be able to ensure a short back focal distance (e.g. less than 25 mm, relative to the full-frame format) suitable for mirrorless recording systems and a position of the exit pupil that is suitable for image recording sensors, the back lens-element groups can comprise at least one lens element comprising an optical material having a refractive index ne of greater than 1.8. In this way, it is also possible to comply with limitations for the maximum diameters of the lens elements on account of limiting diameters, e.g. of a bayonet, that are predefined by the camera or image recording system.

In all lens variants, the five lens-element groups described and illustrated individually represent a specifically necessary, self-contained constituent. Each of the lens-element groups can be optically tuned by itself, which is expressed in particular by the ratio of focal length specified for each lens-element group to the total focal length.

Exemplary embodiments of the lenses according to the invention for the full-frame format are illustrated schematically in the drawing and are described in more specific detail below with reference to the figures.

In this case, in the figures:

BRIEF DESCRIPTION OF THE DRAWINGS

FIGS. 8 and 9 show a lens-element section through in each case a lens with the focal length 50 mm and the maximum aperture number 1.4, FIG. 10 show an image sensor in an imaging plane IM.

DETAILED DESCRIPTION

The movement paths of the respective lens-element groups during the focusing process are illustrated below the lens-element sections in the figures. Horizontal lines represent the positions of the lens-element groups G1, G2, G3, G4 and G5. The upper lines thereof identify the positions in the focus setting infinity, the lower lines the positions in the focus setting at the shortest object distance, and the central lines the positions in a central focus setting. The perpendicular lines are assigned to the stationary lens-element groups G1, G3 and G5, and the oblique lines to the displaceable focusing groups G2 and G4.

Figure 1:
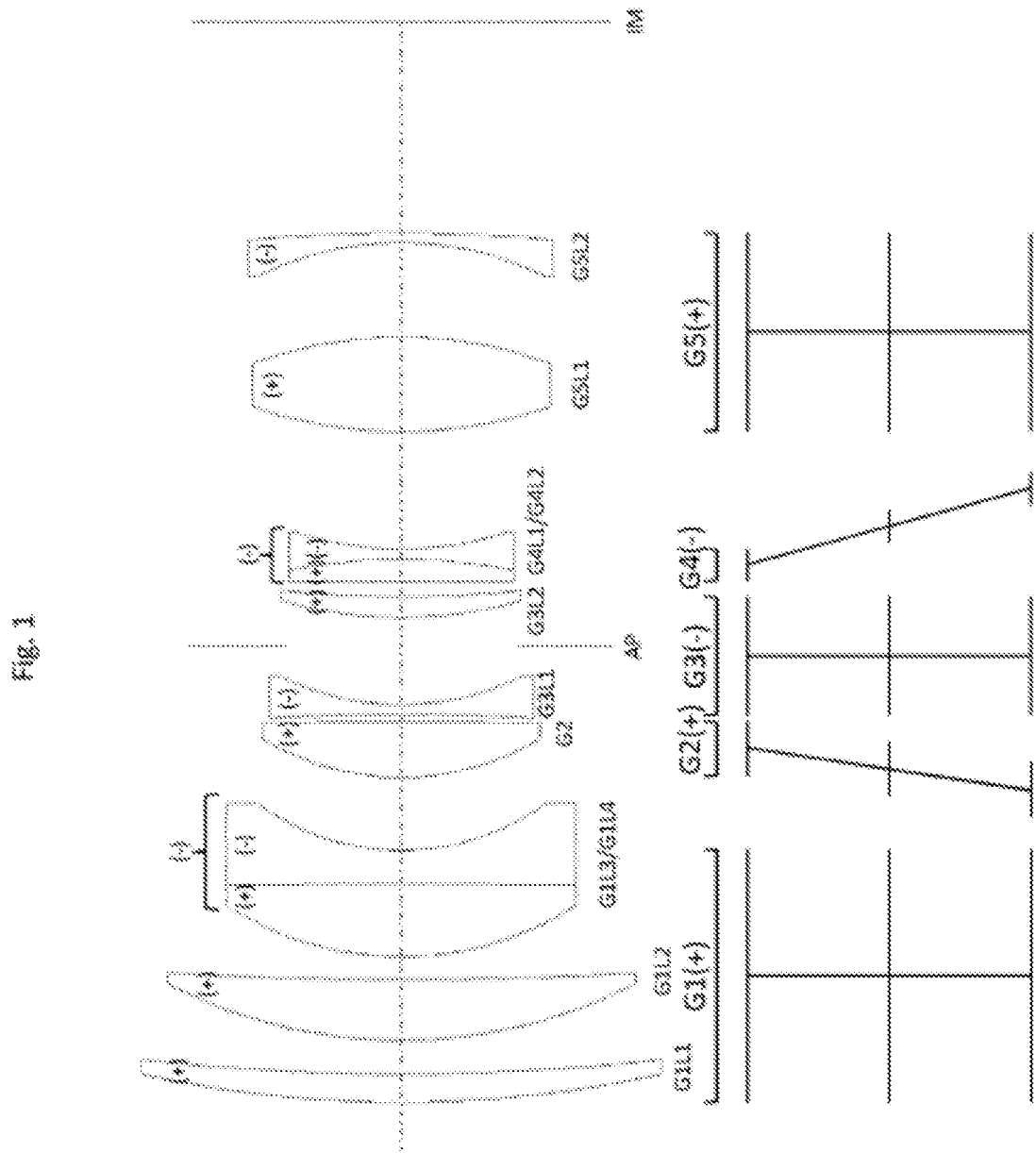
FIG. 1 shows a lens-element section through a lens with the focal length 90 mm and the maximum aperture number 2.

The lens-element sections in the drawing are illustrated to scale, such that relative indications, such as e.g. the material thickness in the case of the lens element G5L2 in FIG. 1, which is considerably thinner in the lens-element center in comparison with the material thickness at the lens-element edge, can be diagrammatically established and checked using conventional geometric means. What is likewise disclosed in this way is that in FIG. 1 the lens element G1L2 has in the lens-element center a material thickness almost exactly two times (2.11 times) thicker than the lens element G1L1. These relationships are readily apparent to the person skilled in the art and so lens-geometries can also be inferred. By way of example, FIG. 1 illustrates that the first lens-element group G1 as viewed from the object side is constructed from, in an order as viewed in the light direction to the imaging plane IM, two convexo-concave lens elements having a positive refractive power, which are spaced apart by approximately the thickness of the first lens element G1L1 and are assigned downstream at a smaller distance a cemented element consisting of a biconvex lens element having a positive refractive power and a biconcave lens element having a negative refractive power.

Concrete exemplary embodiments are evident from the tables below for lenses with a focal length of 90 mm, 70 mm, 50 mm and 24 mm with a maximum aperture number of 2 and two lenses with a focal length of 50 mm and a maximum aperture number of 1.4, wherein the focal lengths are in each case relative to the full-frame format (43.3 mm image circle diameter).

| FIG. 1 | | | | |
|---|---|---|---|---|
| 2/90 | Focal length f [mm] | Refractive power [Dpt.] | fGr/f | Construction |
| G1 | 176.5 | 5.7 | 2.0 | + |
| G2 | 55.0 | 18.2 | 0.6 | + |
| G3 | −91.0 | −11.0 | −1.0 | − |
| G4 | −90.4 | −11.1 | −1.0 | − |
| G5 | 72.1 | 13.9 | 0.8 | + |

Figure 2:
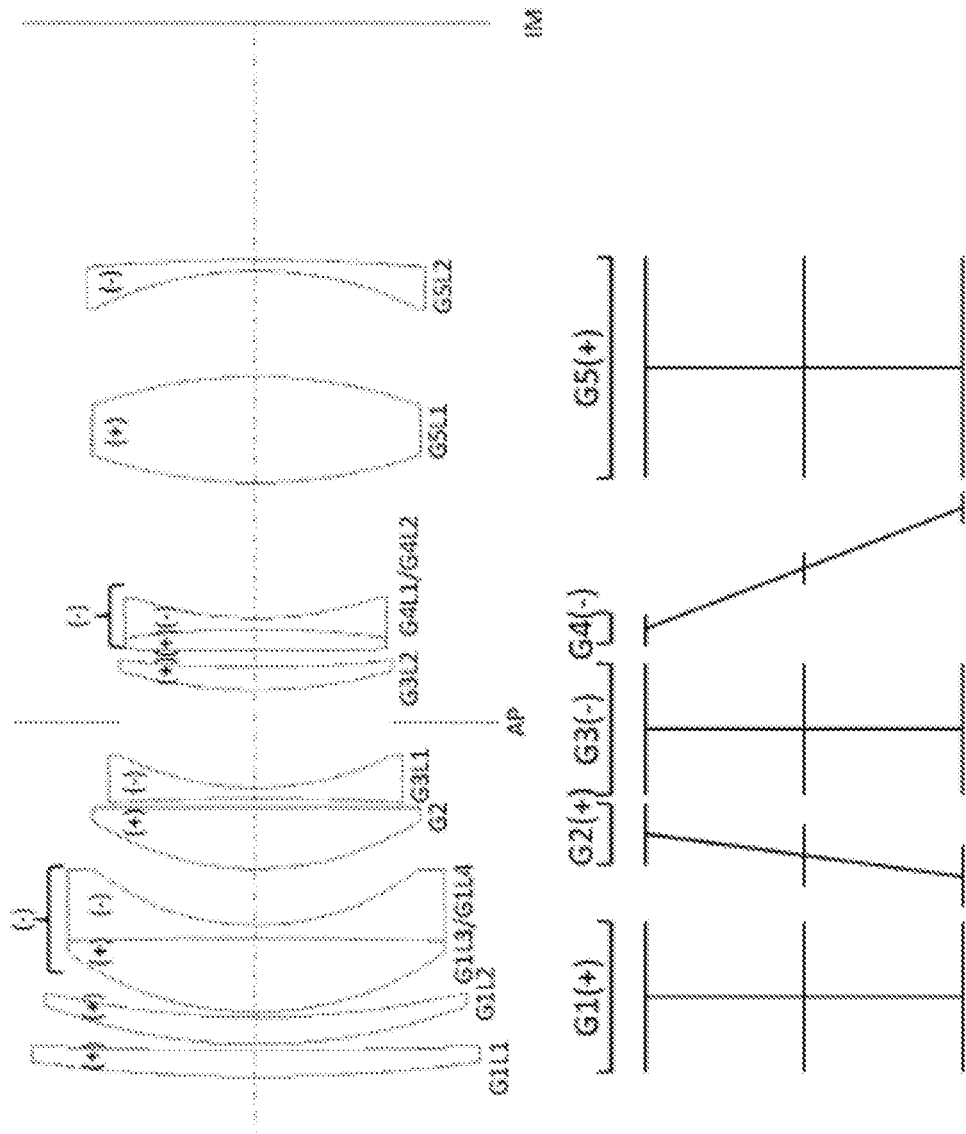
FIG. 2 shows a lens-element section through a lens with the focal length 75 mm and the maximum aperture number 2.

| FIG. 2 | | | | |
|---|---|---|---|---|
| 2/75 | Focal length f [mm] | Refractive power [Dpt.] | fGr/f | Construction |
| G1 | 159.1 | 6.3 | 2.1 | + |
| G2 | 55.0 | 18.2 | 0.7 | + |
| G3 | −91.0 | −11.0 | −1.2 | − |
| G4 | −96.1 | −10.4 | −1.3 | − |
| G5 | 72.1 | 13.9 | 1.0 | + |

Figure 3:
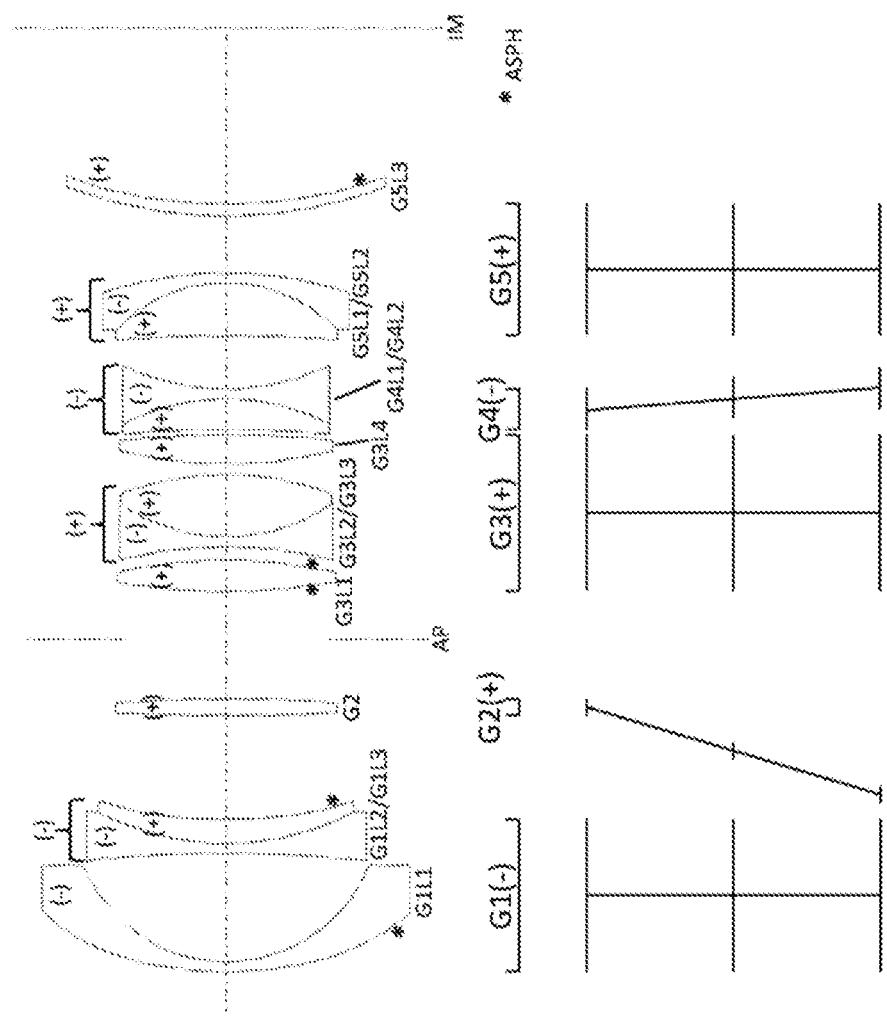
FIGS. 3 and 5 show a lens-element section through in each case a lens with the focal length 24 mm and the maximum aperture number 2.

| FIG. 3 | | | | |
|---|---|---|---|---|
| 2/24 | Focal length f [mm] | Refractive power [Dpt.] | fGr/f | Construction |
| G1 | −36.5 | −27.4 | −1.5 | − |
| G2 | 133.2 | 7.5 | 5.6 | + |
| G3 | 18.0 | 55.6 | 0.8 | + |
| G4 | −24.9 | −40.2 | −1.0 | − |
| G5 | 125.6 | 8.0 | 5.2 | + |

Figure 4:
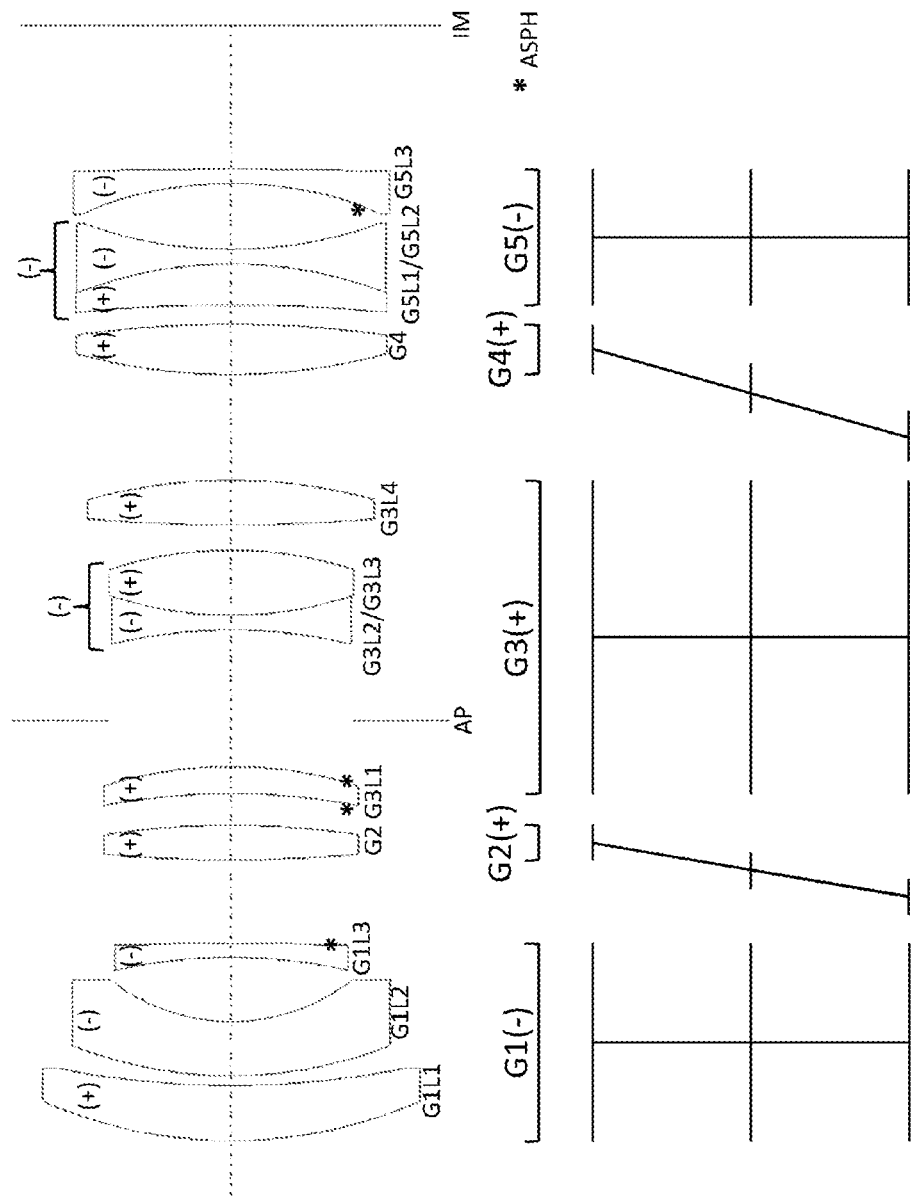
FIG. 4 shows a lens-element section through a lens with the focal length 50 mm and the maximum aperture number 2.

| FIG. 4 | | | | |
|---|---|---|---|---|
| 2/50 | Focal length f [mm] | Refractive power [Dpt.] | fGr/f | Construction |
| G1 | −83.9 | −11.9 | −1.7 | − |
| G2 | 63.0 | 15.9 | 1.3 | + |
| G3 | 29.9 | 33.5 | 0.6 | + |
| G4 | −66.1 | −15.1 | −1.3 | − |
| G5 | −84.8 | −11.8 | −1.7 | − |

Figure 5:
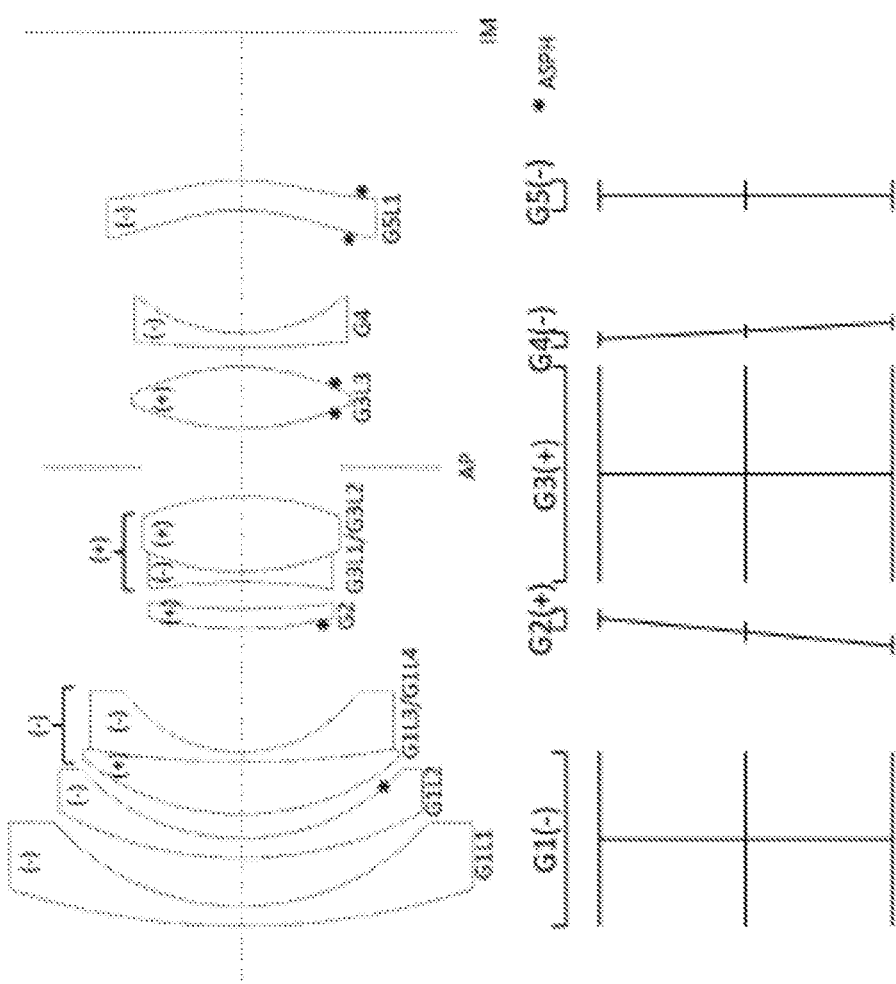
Figure 6:
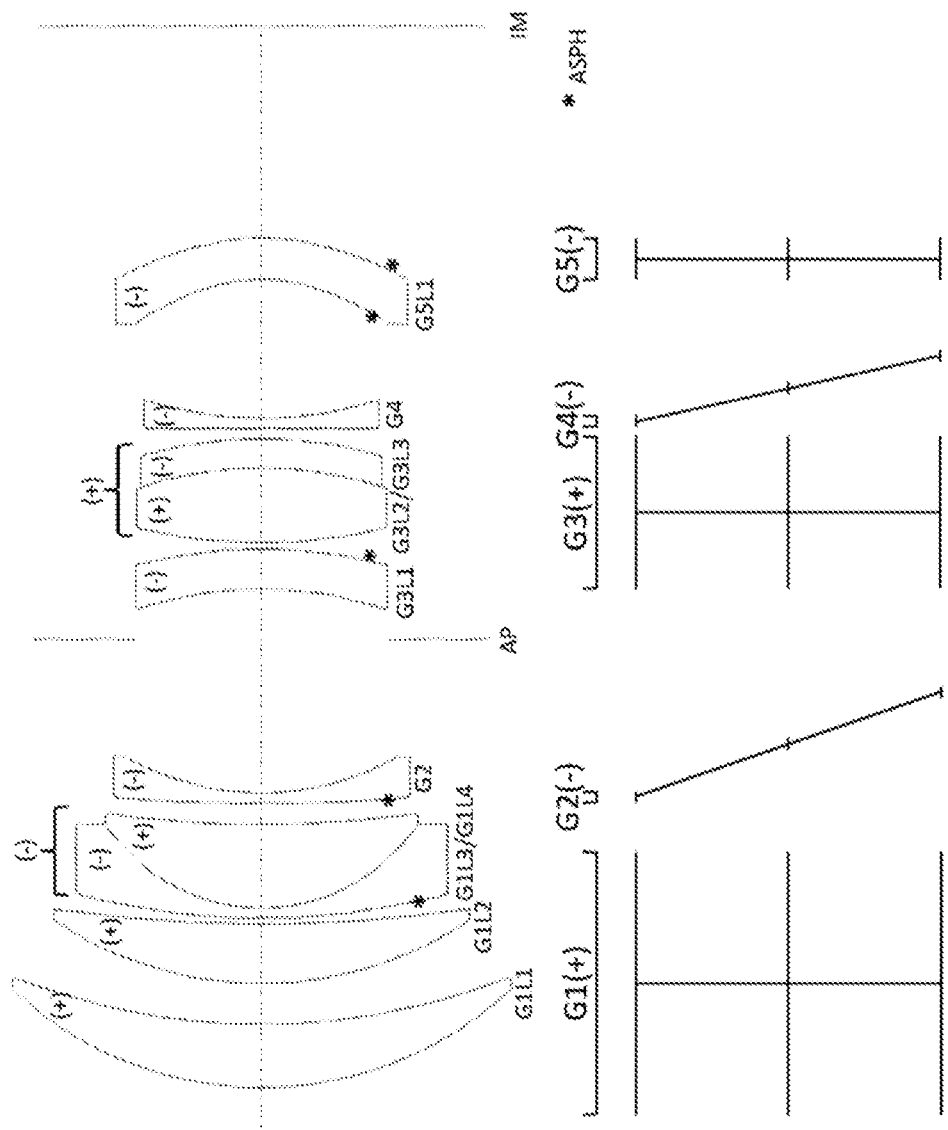
FIGS. 6 and 7 show a lens-element section through a lens with the focal length 90 mm and the maximum aperture number 2.
Figure 7:
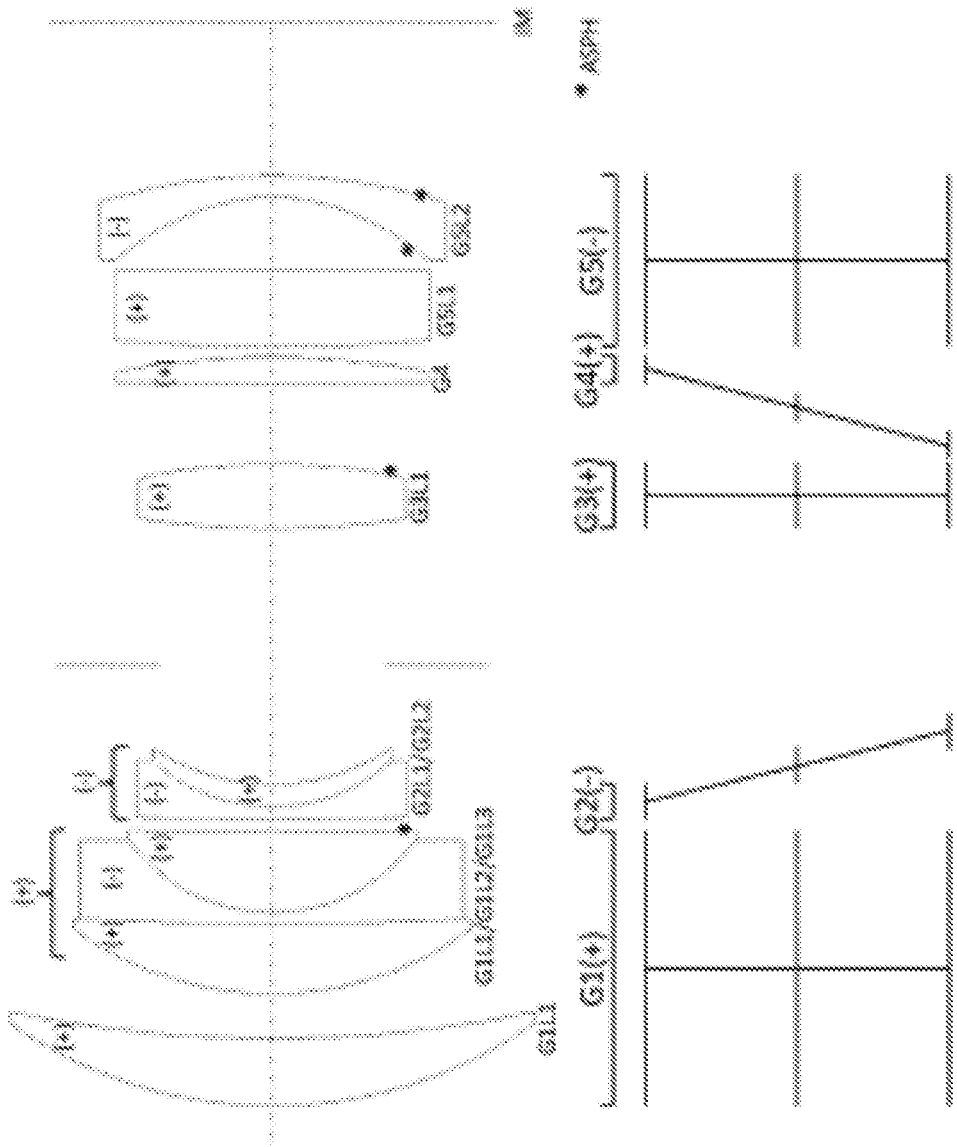
Figure 8:
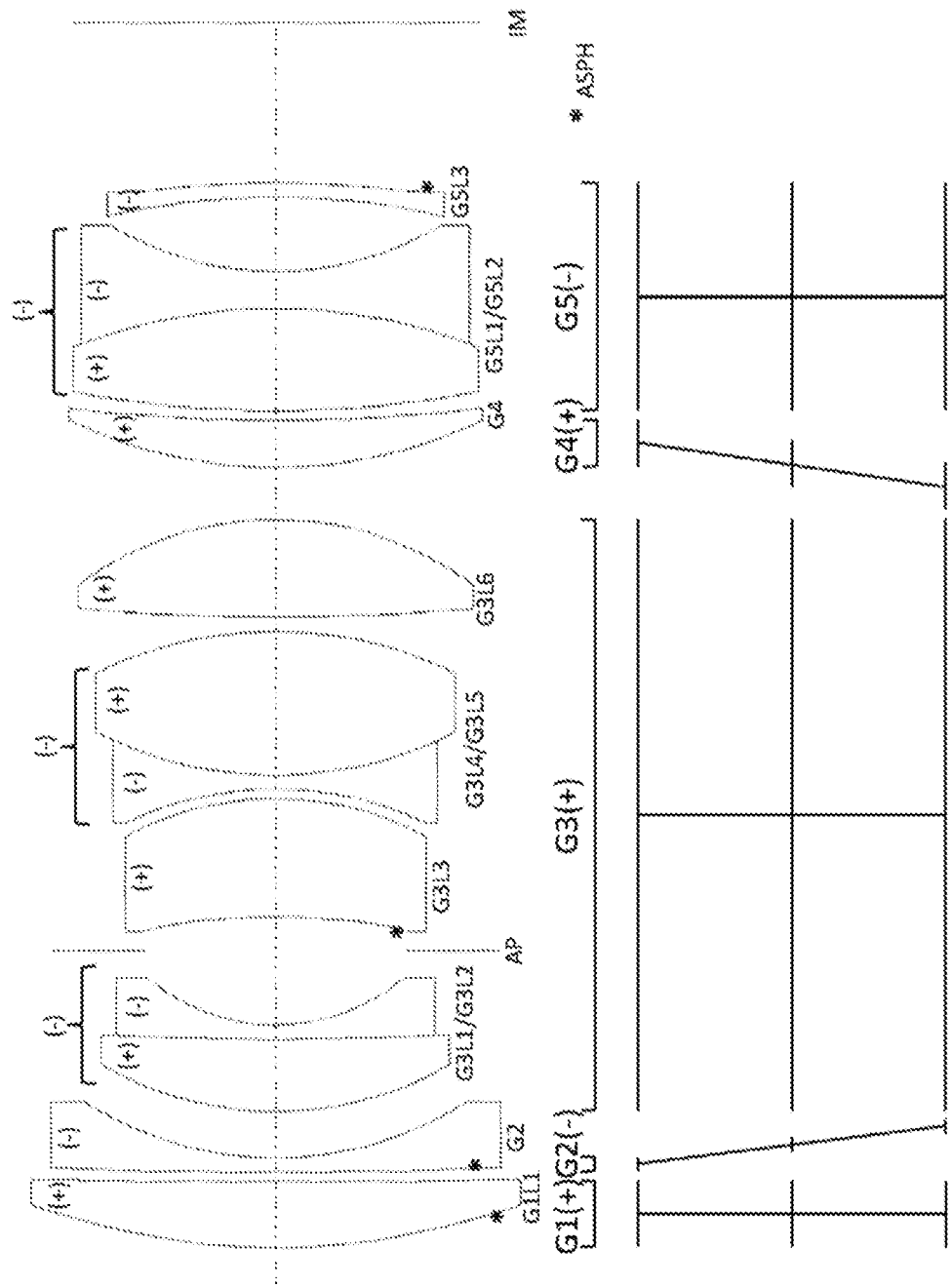

| FIG. 5 | | | | |
|---|---|---|---|---|
| 2/24 | Focal length f [mm] | Refractive power [Dpt.] | fGr/f | Construction |
| G1 | −37.6 | −26.6 | −1.6 | − |
| G2 | 105.1 | 9.5 | 4.4 | + |
| G3 | 18.4 | 54.3 | 0.8 | + |
| G4 | −42.4 | −23.6 | −1.8 | − |
| G5 | −499.2 | −2.0 | −20.8 | − |

FIG. 6

| 2/90 | Focal length f' [mm] | Refractive power [Dpt.] | f'Gr/f' | Construction |
|---|---|---|---|---|
| G1 | 64.9 | 15.4 | 0.7 | + |
| G2 | −61.3 | −16.3 | −0.7 | − |
| G3 | 32.4 | 30.9 | 0.4 | + |
| G4 | −76.5 | −13.1 | −0.8 | − |
| G5 | −111.2 | −9.0 | −1.2 | − |

FIG. 7

| 2/90 | Focal length f' [mm] | Refractive power [Dpt.] | f'Gr/f' | Construction |
|---|---|---|---|---|
| G1 | 53.1 | 18.8 | 0.6 | + |
| G2 | −36.4 | −27.5 | −0.4 | − |
| G3 | 78.8 | 12.7 | 0.9 | + |
| G4 | 79.8 | 12.5 | 0.9 | + |
| G5 | −68.0 | −14.7 | −0.8 | − |

FIG. 8

| 1.4/50 | Focal length f' [mm] | Refractive power [Dpt.] | f'Gr/f' | Construction |
|---|---|---|---|---|
| G1 | 80.9 | 12.4 | 1.6 | + |
| G2 | −78.5 | −12.7 | −1.6 | − |
| G3 | 56.7 | 17.6 | 1.1 | + |
| G4 | 108.4 | 9.2 | 2.2 | + |
| G5 | −87.9 | −11.4 | −1.8 | − |

FIG. 9

| 1.4/50 | Focal length f' [mm] | Refractive power [Dpt.] | f'Gr/f' | Construction |
|---|---|---|---|---|
| G1 | 581.0 | 1.7 | 11.6 | + |
| G2 | 95.1 | 10.5 | 1.9 | + |
| G3 | 62.5 | 16.0 | 1.3 | + |
| G4 | 106.3 | 9.4 | 2.1 | + |
| G5 | −104.3 | −9.6 | −2.1 | − |

What is claimed is:

1. A lens system with a fixed focal length, comprising:
five lens groups, wherein three lens groups are mounted in a stationary manner and two lens groups are mounted in a displaceable manner along an optical axis, wherein the lens system comprises the following lens groups in order from an object side of the lens system to an image side, wherein
a first lens group as viewed from an object side is arranged in a stationary manner having a negative or positive refractive power,
a second lens group configured as a focusing front group is arranged in a displaceable manner having a positive refractive power,
a third lens group having a positive or negative refractive power and containing a stationary iris diaphragm, the aperture of which is adjustable, the third lens group being arranged in a stationary manner,
a fourth lens group configured as a focusing back group is arranged in a displaceable manner having a negative refractive power, and
a fifth lens group having a negative or positive refractive power is arranged in a stationary manner relative to an imaging plane in a lens barrel and both the focusing front group and the focusing back group are movable jointly relative to one another and to the lens groups arranged in a stationary manner in order to focus the fixed focal length lens system on objects at different object distances.

2. The lens system as claimed in claim 1, wherein both the focusing front group and the focusing back group move away from the imaging plane during focusing from infinity to the near setting.

3. The lens system as claimed in claim 1, wherein the focusing front group moves away from the imaging plane during focusing from infinity to the near setting and in that the focusing back group moves toward the imaging plane during focusing from infinity to the near setting.

4. The lens system as claimed in claim 1, wherein both the focusing front group and the focusing back group move toward the imaging plane during focusing from infinity to the near setting.

5. The lens system as claimed in claim 1, wherein the focusing front group moves toward the imaging plane during focusing from infinity to the near setting and in that the focusing back group moves away from the imaging plane during focusing from infinity to the near setting.

6. The lens system as claimed in claim 3, wherein
the ratio f1/f of the focal lengths f1 of the first lens group and f of the entire lens system lies between −40 and 30,
the ratio f2/f of the focal lengths f2 of the focusing front group and f of the entire lens system lies between −10 and 20,
the ratio f3/f of the focal lengths f3 of the third lens group and f of the entire lens system lies between −30 and 40,
the ratio f4/f of the focal lengths f4 of the focusing back group and f of the entire lens system lies between −10 and 20, and
the ratio f5/f of the focal lengths f5 of the fifth lens group and f of the entire lens system lies between −40 and 30.

7. The lens system as claimed in claim 4, wherein the lens system has a ratio of the total focal length f to the image circle diameter in the imaging plane of between 0.3 and 5.

8. The lens system as claimed in claim 5, wherein the ratio V of the volume of the focusing front group and focusing back group to the image circle diameter (Bd) in the imaging plane raised to the third power lies below $0.1 (V/Bd^3 < 0.1)$, or the weight of each of the focusing front group and focusing back group lies below 15 g.

9. The lens system as claimed in claim 6, wherein either
the first lens group consists of a first lens element, a second lens element, a third lens element, and a fourth lens element, in any order, wherein the first lens element, the second lens element and the third lens element have a positive refractive power and the fourth lens element has a negative refractive power, wherein the third lens element and the fourth lens element are combined to form a lens doublet having a negative total refractive power, or
the first lens group consists of a first lens element, a second lens element, a third lens element, and a fourth lens element, in any order, wherein the first lens element and the second lens element have a positive refractive power, and the third lens element has a negative refractive power and the fourth lens element has a positive refractive power, wherein either the third lens element and the fourth lens element are combined to form a lens doublet having a negative total refractive power, or the second lens element, the third lens element and the fourth lens element are combined to form a cemented element having a positive total refractive power, or the first lens group consists of a first lens element, a second lens element, a third lens element, and a fourth lens element, in any order, wherein the first lens element and the second lens element have a negative refractive power and the third lens element has a negative refractive power, and the fourth lens element has a negative refractive power, wherein the third lens element and the fourth lens element are combined to form a lens doublet having a negative total refractive power or the first lens group consists of one lens element having a negative or positive refractive power, or the first lens group consists of a first lens element, and a second lens element, in any order, wherein the first lens element has a positive refractive power and the second lens element has a negative refractive power, which lens elements are combined to form a lens doublet having a negative total refractive power, or the first lens group consists of a first lens element, a second lens element, and a third lens element, in any order, wherein the first lens element and the second lens element have a negative refractive power and the third lens element has a positive refractive power, wherein the second lens element and the third lens element are combined to form a lens doublet having a negative total refractive power.

10. The lens system as claimed in claim 7, wherein either the third lens group consists of one lens element having a positive refractive power and the iris diaphragm is arranged in a stationary fashion upstream thereof, or the third lens group consists of a first lens element, and a second lens element, in any order, wherein the first lens element has a negative refractive power and the second lens element has a positive refractive power, and the iris diaphragm is arranged in a stationary fashion between the first lens element and the second lens element, or the third lens group consists of a first lens element, a second lens element, and a third lens element, in any order, wherein the first lens element has a negative refractive power, the second lens element has a positive refractive power and the third lens element has a positive refractive power, wherein the first lens element and the second lens element are combined to form a lens doublet having a positive total refractive power, and the iris diaphragm is arranged in a stationary fashion between the lens doublet and the third lens element, or the third lens group consists of a first lens element, a second lens element, a third lens element, and a fourth lens element, in any order, wherein the first lens element has a negative refractive power, the second lens element has a positive refractive power and the third lens element has a negative refractive power, wherein the second and third lens elements are combined to form a lens doublet having a positive total refractive power, and the iris diaphragm is arranged in a stationary fashion upstream of the first lens element, or the third lens group consists of four lens elements, wherein the first lens element has a positive refractive power, the second lens element has a negative refractive power, the third lens element has a positive refractive power and the fourth lens element has a positive refractive power, and the second and third lens elements are combined to form a lens doublet having a positive total refractive power, and the iris diaphragm is arranged in a stationary fashion upstream of the first lens element, or the third-lens group consists of a first lens element, a second lens element, a third lens element, a fourth lens element, and a fifth lens element, in any order, wherein the first lens element has a positive refractive power and the second lens element has a negative refractive power and both lens elements are combined to form a lens doublet having a negative total refractive power, the third lens element has a negative refractive power and the fourth lens element has a positive refractive power and both lens elements are combined to form a lens doublet having a positive total refractive power, and the fifth lens element has a positive refractive power, and the iris diaphragm is arranged in a stationary fashion between the two lens doublets, or the third lens group consists of a first lens element, a second lens element, a third lens element, a fourth lens element, a fifth lens element, and a sixth lens element, in any order, wherein the first lens element has a positive refractive power and the second lens element has a negative refractive power and both lens elements are combined to form a lens doublet having a negative total refractive power, the third lens element has a positive refractive power, the fourth lens element has a negative refractive power and the fifth lens element has a positive refractive power and the fourth and fifth lens elements are combined to form a lens doublet having a negative total refractive power, and the sixth lens element has a positive refractive power, and the iris diaphragm is arranged in a stationary fashion between the first lens doublet and the third lens element.

11. The lens system as claimed in claim 8, wherein either the fifth lens group consists of a first lens element, a second lens element, and a third lens element, in any order, wherein the first lens element has a positive refractive power, the second lens element has a negative refractive power and both lens elements are combined to form a lens doublet having a negative total refractive power, and the third lens element has a negative refractive power, or the fifth lens group consists of a first lens element, a second lens element, and a third lens element, in any order, wherein the first lens element has a positive refractive power, the second lens element has a negative refractive power and both lens elements are combined to form a lens doublet having a positive total refractive power, and the third lens element has a positive refractive power, or the fifth lens group consists of a first lens element, and a second lens element, in any order, wherein the first lens element has a positive refractive power and the second lens element has a negative refractive power, or the fifth lens group consists of one lens element having a negative refractive power.

* * * * *